3,156,568
PROCESS OF MAKING LOW-FAT RIPENED
SKIM MILK CHEESE
Robert E. Hargrove, Fairfax, Va., and Frank E. McDonough, Accokeek, Md., assignors to the United States of America as represented by the Secretary of Agriculture
No Drawing. Filed Feb. 28, 1963, Ser. No. 261,906
13 Claims. (Cl. 99—116)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to a novel cheese product and the process of manufacture thereof.

Low-fat ripened cheese is unavailable for retail consumption despite the consumers demand for a fat-free or low-fat semihard ripened cheese. The demand comes in part from those who wish to avoid high fat containing foods as a means of controlling body weight, but chiefly comes from cheese lovers who fear a possible connection between fat in the diet and the development of arteriosclerosis.

When fat-free ripened cheese, designated as skim milk cheese for manufacturing purposes, is made by conventional methods, the body, texture and flavor of the product is not acceptable for ordinary consumer use. This cheese is extremely hard, leathery and tough, and is almost completely devoid of flavor, thus accounting for its diversion into other foods.

An object of the present invention is to provide a new cheese product. Another object is to make a low-fat cheese of desirable body and flavor. A further object is to provide a novel process for cheese manufacture. Other objects and a fuller understanding of the invention may be had by referring to the following description and claims.

A markedly different cheese product, low in fat content and relatively high in moisture and milk-solids-not-fat, yet resembling cheddar cheese in texture and flavor, is obtained by the process of the present invention. Although significant departures from conventional procedures are employed in this novel process, less time is required in the making procedure than is normally required for cheddar cheese and similar types.

Innovations in the process include adding a small amount of well dispersed cream to skim milk with a resulting improvement in texture of the product; partial development of flavor by a pretreatment of the cream portion; the use of an atypical starter culture; the prevention of rapid development of acid in the cheese milk, almost all of the acid being formed after hooping and pressing; and pressing out in the substantial absence of air.

In general according to the present invention cream containing about 20% milk fat is pasteurized at a temperature in the range of about 175–190° F., homogenized, combined with lipase and allowed to stand at about 40–50° F. to develop rancidity, about 2% by weight of the enzyme treated cream is combined with about 98% by weight skim milk to provide a cheese milk, the cheese milk is pasteurized at a temperature in the range of about from 170–185° F., preferably at about 175° F., and then homogenized at a pressure not appreciably more than 1,000 p.s.i.g., the temperature of the cheese milk is adjusted to about from 88 to 90° F., a starter culture containing *Streptococcus cremoris*, Leuconostoc, and another microorganism such as *Lactobacillus lactics*, *Bacterium linens*, *Micrococcus caseolyticus*, and *Pseudomonas fragi*, is admixed with the cheese milk and, shortly thereafter, rennet is admixed with the inoculated milk to coagulate the curd, after about one hour the curd is cut, stirring is begun, the curd is cooked, whey is drained from the cooked curd, the curd is salted and hooped, the wet curd is pressed out in substantially the absence of air, and the pressed chesse is allowed to cure.

The cream containing about 20% milk fat is readily obtainable for example, directly from a separator, by blending of creams of higher and lower fat content, or by diluting a high fat-content cream with milk, and the particular means is immaterial to the invention. The cream fraction containing about 20% milk fat does, however, have several important functions in the present process.

The level of milk fat in the cheese milk is very low, about 0.3%–0.5%. A maximum dispersion of fat globules contributes to the soft and smooth texture of the cheese product. Homogenization of the cheese milk should not be conducted at too high pressures, however, because the protein is altered and results in a hard curd. The 20% cream can tolerate homogenization at much higher pressure, and 3,000 p.s.i.g. was used to disperse the fat in the cream. Then, when the cream and skim milk were combined, homogenization at 1,000 p.s.i.g. was sufficient to provide a uniform dispersion of tiny fat globules in the cheese milk.

The cream containing about 20% fat is also according to the present invention, a means of contributing flavor to the cheese. Lipase is allowed to act upon the fat, developing rancidity. Lipase is obtained from various sources. A convenient source is commercial calf lipase. Another source is to culture a lipase producing Pseudomonas, such as *Pseudomonas fragi* in the cream. Whereas the present process was designed to produce a mild, cheddar-like flavor, more rancidity may be developed to produce a flavor similar to provolone or romano. Hence, the amount of rancidity is considered a flavor characteristic and is not critical to the preparation of a low-fat, soft textured cheese.

The parteurization temperatures employed in the process, especially the temperature of pasteurizing the cheese milk, appears to be a significant factor in determining quality of the curd. In order to obtain a soft curd, pasteurization is conducted at a temperature of about 170–190° F., preferably at about 175–180° F.

In making this new type of cheese the process is designed to prevent the rapid development of acid in the cheese milk. The inoculated, rennet treated milk is not subjected to the conventional ripening period which is conducive to acid formation and results in a cheese which becomes hard, dry, and fails to show protein break down. In the new process the titratable acidity of the milk or whey prior to dipping reaches a value of only about 0.15 as compared with values of 0.35 to 0.4 in a typical cheddar cheese process. The starter culture contains either *Lactobacillus lactis*, *Bacterium linens*, *Micrococcus caseolyticus* or *Pseudomonas fragi*, in addition to the *Streptococcus cremoris* and Leuconostoc. Faster breakdown is achieved by including one of the additional microorganisms. Although the acid is only about 0.15 at dipping, the organisms continue to function even after salting so that the pressed cheese (usually 21–24 hours after dipping) has a pH in the range of about 5.0–5.3 and develops a sharp flavor.

The soft curd is conducive to entrapment of air so that the physical and flavor properties are not comparable to that of cheddar unless the hooped curd is pressed out substantially in the absence of air. Air is removed by pressing out under vacuum, or, alternatively, the curd is hooped and pressed out while submerged to exclude air from the cheese.

The appearance of the product is enhanced by adding cheese color to the cheese milk, after the fashion of a cheddar cheese process. While considered important for consumer acceptance of the product, adding the cheese color, typically just before or just after adding the culture, is not a necessary step in the process.

Practice of the invention is illustrated by the following examples, although they are not presented as limitations thereof.

*Example 1*

Cream was standardized to contain 20% milk fat, pasteurized at 185° F. for 15 seconds, and homogenized at 3,000 p.s.i.g. A 1% inoculum of a whole milk culture of *Pseudomonas fragi* was added, and the inoculated cream allowed to stand one week at 40° F. to develop rancidity.

Fully skimmed milk was prepared by separating whole milk. Homogenized, somewhat rancid, 20% cream was combined with skim milk at the rate of about 2 lbs. cream per 100 lbs. skim milk. The cheese milk mixture was pasteurized at 175° F. for 15 seconds, then homogenized at 1,000 p.s.i.g., and introduced into the vat. Cheese color was added at the rate of 1 ml. per 100 lbs. cheese milk. Starter cultures, one containing *Streptococcus cremoris* and Leuconostoc and the other containing *Lactobacillus lactis*, were each added at the rate of 1 lb. starter per 100 lbs. cheese milk and mixed into the cheese milk. Rennet, at the rate of 8 ml. per 100 lbs. cheese milk, was admixed as soon as the starter cultures were well distributed in the cheese milk, usually 3–5 minutes after adding the starter. After one hour the curd was cut with ½" knives and slow agitation was begun. After 15 minutes slow agitation, the contents of the vat were heated to 102° F. over a 30 minute period. After 10 minutes at 100–102° F. excess whey was drained, and the curd particles were stirred constantly to prevent matting. After 10 to 30 minutes of draining and stirring, the curd was salted at the rate of 200 gm. salt per 100 lbs. cheese milk. The wet, salted curd was placed in cheese hoops, pressed immediately for one hour, and then placed in a vacuum chamber for 45 minutes to remove air from the curd. Following vacuum treatment the hooped curd was pressed again for 24 hours, then removed from the hoops and measured for acidity. As soon as the pH was 5.3 or lower, the cheese was waxed, placed in a 40° F. curing room, and cured 3 to 6 months at 40–60° F.

Analysis of the product gave 4.26% fat, 54.77% moisture, 1.58% salt, and pH 5.3.

*Example 2*

Following the procedure of Example 1, but with a different batch of milk and a higher level of salt, there was obtained cheese analyzing 3.98% fat, 58.30% moisture, 1.86% salt and pH 5.2.

*Example 3*

The procedure of Example 1 was repeated with the exception that the rancidity in the 20% cream was produced by adding 2 gm. commercial calf lipase per gallon of cream and holding the cream at 50° F. for 24 hours.

A cheese product with texture, flavor, and analysis approximately that of Example 1 was obtained.

This cheese product, which contains about 40% milk solids not fat, about 4 to 5% butterfat, about 52 to 58% moisture, and about 1.3 to 1.8% salt, is quite different from any other type of cheese. Although the cheese resembles cheddar in texture and flavor, it contains only about one-tenth the butterfat, has more milk solids not fat, and more moisture.

In addition to the type of cheese illustrated in the examples, low-fat ripened skim milk cheese of other types can be prepared by slight modifications in the process of present invention. A provolone type of rancidity and flavor is developed in the low-fat cheese by adding animal lipase, such as the commercial calf lipase, directly to the cheese milk after pasteurization. Alternatively, lipase obtained from *Penicillium roqueforti*, added to the cheese milk after pasteurization, causes lipolysis to produce a blue cheese type of rancidity and flavor.

We claim:

1. A process of manufacturing a low-fat ripened skim milk cheese comprising pasteurizing a cream containing about 20% milk fat at a temperature in the range of about 175–190° F., homogenizing the pasteurized cream, combining about 2% by weight homogenized, pasteurized cream with about 98% by weight skim milk to provide a cheese milk, pasteurizing the cheese milk at a temperature in the range of about from 170–185° F., homogenizing the pasteurized cheese milk at a pressure of not appreciably more than 1,000 p.s.i.g., inoculating the homogenized, pasteurized cheese milk with a starter culture containing *Streptococcus cremoris*, Leuconostoc, and a microorganism selected from the group consisting of *Lactobacillus lactis*, *Bacterium linens* and *Micrococcus caseolyticus*, thereafter admixing rennet with the inoculated cheese milk to coagulate the curd, cutting the curd after about one hour, stirring and cooking the curd, draining the curd, salting the curd, hooping the curd, pressing out the wet curd in substantially the absence of air, and curing the cheese, and, as a step following homogenizing the pasteurized cream and prior to admixing rennet to the cheese milk, adding to the fat a lipase selected from the group consisting of an animal lipase and a microbial lipase to contribute flavor to the cheese.

2. A process of manufacturing a low-fat ripened skim milk cheese comprising pasteurizing a 20% cream at a temperature in the range of about from 175–190° F., homogenizing the pasteurized cream, combining lipase with the homogenized, pasteurized cream, allowing the lipase-containing cream to stand at about from 40–50° F. to develop rancidity, combining about 2% by weight of the enzyme treated cream with about 98% by weight skim milk to provide a cheese milk, pasteurizing the cheese milk at a temperature in the range of about from 170–185° F., homogenizing the pasteurized cheese milk at a pressure not appreciably more than 1,000 p.s.i.g., inoculating the homogenized, pasteurized cheese milk with a starter culture containing *Streptococcus cremoris*, Leuconostoc, and a microorganism selected from the group consisting of *Lactobacillus lactis*, *Bacterium linens*, *Micrococcus caseolyticus* and *Pseudomonas fragi*, immediately thereafter admixing rennet with the inoculated cheese milk to coagulate the curd, cutting the curd after about one hour, stirring and cooking the curd, draining the curd, salting the curd, hooping the curd, pressing out the wet curd in substantially the absence of air, and curing the cheese.

3. The process of claim 2 in which said microorganism is *Lactobacillus lactis*.

4. The process of claim 2 in which said microorganism is *Bacterium linens*.

5. The process of claim 2 in which said microorganism is *Micrococcus caseolyticus*.

6. The process of claim 2 in which said microorganism is *Pseudomonas fragi*.

7. A process of manufacturing a low-fat ripened skim milk cheese comprising pasteurizing a 20% cream at a temperature in the range of about from 175–190° F., homogenizing the pasteurized cream, combining commercial calf lipase at the level of about 2 gm. per gallon of homogenized, pasteurized cream, allowing the lipase-containing cream to stand at about from 40–50° F. for 24 hours to develop rancidity, combining about 2% by weight of the enzyme treated cream with about 98% by weight skim milk to provide a cheese milk, pasteurizing the cheese milk at a temperature in the range of about from 170–185° F., homogenizing the pasteurized cheese milk at a pressure not appreciably more than 1,000 p.s.i.g., adding color, inoculating the homogenized, pasteurized cheese milk with a starter culture containing *Streptococcus*

*cremoris*, Leuconostoc, and a microorganism selected from the group consisting of *Lactobacillus lactis*, *Bacterium linens* and *Micrococcus caseolyticus*, immediately thereafter admixing rennet with the inoculated cheese milk to coagulate the curd, cutting the curd after about one hour, stirring and cooking the curd, draining the curd, salting the curd, hooping the curd, pressing out the wet curd in substantially the absence of air, and curing the cheese to obtain a low-fat product resembling cheddar cheese in flavor, color, and texture.

8. The process of claim 7 in which said microorganism is *Lactobacillus lactis*.

9. A process of manufacturing a low-fat ripened skim milk cheese comprising pasteurizing a 20% cream at a temperature in the range of about from 175–190° F., homogenizing the pasteurized cream, combining a 1% inoculum of *Pseudomonas fragi* with the homogenized, pasteurized cream, allowing the inoculated cream to stand about one week at about 40° F. to develop rancidity, combining about 2% by weight of the enzyme treated cream with about 98% by weight skim milk to provide a cheese milk, pasteurizing the cheese milk at a temperature in the range of about from 170–185° F., homogenizing the pasteurized cheese milk at a pressure not appreciably more than 1,000 p.s.i.g., adding color, inoculating the homogenized, pasteurized cheese milk with a starter culture containing *Streptococcus cremoris*, Leuconostoc, and a microorganism selected from the group consisting of *Lactobacillus lactis*, *Bacterium linens* and *Micrococcus caseolyticus*, immediately thereafter admixing rennet with the inoculated cheese milk to coagulate the curd, cutting the curd after about one hour, stirring and cooking the curd, draining the curd, salting the curd, hooping the curd, pressing out the wet curd in substantially the absence of air, and curing the cheese to obtain a low-fat product resembling cheddar cheese in flavor, color and texture.

10. The process of claim 9 in which said microorganism is *Lactobacillus lactis*.

11. The process of claim 1 in which contacting the fat with a lipase comprises adding commercial calf lipase to the homogenized, pasteurized cheese milk.

12. The process of claim 1 in which contacting the fat with a lipase comprises adding to the homogenized pasteurized cheese milk a culture of *Pseudomonas fragi*.

13. The process of claim 1 in which contacting the fat with a lipase comprises adding to the homogenized, pasteurized cheese milk lipase obtained from *Penicillium roqueforti*.

References Cited in the file of this patent
UNITED STATES PATENTS

| | | |
|---|---|---|
| 1,578,820 | Gere | Mar. 30, 1926 |
| 2,531,329 | Farnham | Nov. 21, 1950 |
| 2,701,204 | Strezynski | Feb. 1, 1955 |
| 2,813,028 | Jackson | Nov. 12, 1957 |